US012799374B2

(12) United States Patent
Kobayashi et al.

(10) Patent No.: US 12,799,374 B2
(45) Date of Patent: Nov. 17, 2026

(54) THERMOSETTING COMPOSITION, ELECTRONIC DEVICE, AND METHOD FOR PRODUCING ELECTRONIC DEVICE

(71) Applicant: Panasonic Intellectual Property Management Co., Ltd., Osaka (JP)

(72) Inventors: Yuki Kobayashi, Mie (JP); Takahiro Wakaiki, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 417 days.

(21) Appl. No.: 18/551,330

(22) PCT Filed: Mar. 18, 2022

(86) PCT No.: PCT/JP2022/012694
§ 371 (c)(1),
(2) Date: Mar. 1, 2024

(87) PCT Pub. No.: WO2022/202683
PCT Pub. Date: Sep. 29, 2022

(65) Prior Publication Data

US 2024/0400871 A1 Dec. 5, 2024

(30) Foreign Application Priority Data

Mar. 22, 2021 (JP) ................................ 2021-047797

(51) Int. Cl.

| | |
|---|---|
| ***C08F 2/46*** | (2006.01) |
| ***B32B 7/12*** | (2006.01) |
| ***B32B 37/12*** | (2006.01) |
| ***C08F 2/50*** | (2006.01) |
| ***C08G 61/04*** | (2006.01) |
| ***C08L 63/00*** | (2006.01) |
| ***C09J 163/00*** | (2006.01) |

(52) U.S. Cl.
CPC ............... *C09J 163/00* (2013.01); *B32B 7/12* (2013.01); *B32B 37/1207* (2013.01); *C08L 63/00* (2013.01); *B32B 2255/26* (2013.01); *B32B 2310/0837* (2013.01); *B32B 2457/00* (2013.01)

(58) Field of Classification Search
CPC ... B32B 37/1207; B32B 7/12; B32B 2457/00; B32B 2310/0837; B32B 2255/26; C09J 129/10; C09J 171/00; C09J 11/02; C09J 163/00; C08G 59/686; C08G 59/40; C08G 65/18; C08K 3/013; C08K 5/29; C08K 5/10
USPC ................ 522/15, 6, 189, 184, 71, 1; 520/1
See application file for complete search history.

(56) References Cited

U.S. PATENT DOCUMENTS

2007/0208106 A1* 9/2007 Chen .................... C08G 59/226 523/137
2019/0136041 A1 5/2019 Matsuoka
2020/0208019 A1 7/2020 Matsuoka

FOREIGN PATENT DOCUMENTS

CN 104991419 A * 10/2015
CN 105086605 A * 11/2015
JP H07-252402 A 10/1995
JP 2008-169240 A 7/2008
JP 2008-266531 A 11/2008
WO WO-2005059002 A1 * 6/2005 ........... C08G 59/226
WO 2017/094584 A1 6/2017
WO WO-2017175735 A1 * 10/2017 ............. C08G 59/24
WO 2021/117396 A1 6/2021

OTHER PUBLICATIONS

Chen et al, WO 2005059002 Machine Translation, Jun. 30, 2005 (Year: 2005).*
Matsuoka, WO 2017175735 Machine Translation, Oct. 12, 2017 (Year: 2017).*
Liu et al, CN 105086605 Machine Translation, Nov. 25, 2015 (Year: 2015).*
Yang et al, CN 104991419 Machine Translation, Oct. 21, 2015 (Year: 2015).*
International Search Report dated May 24, 2022 issued in International Patent Application No. PCT/JP2022/012694, with English translation.

* cited by examiner

*Primary Examiner* — Jessica Whiteley
(74) *Attorney, Agent, or Firm* — Rimon P.C.

(57) ABSTRACT

A thermosetting composition contains: a resin (A) including at least one type of group selected from the group consisting of epoxy group, oxetane group, and vinyl ether group; a cationic thermal polymerization initiator (B); a cationic photopolymerization initiator (C); and a stabilizer (D). The stabilizer (D) includes at least one of a surfactant (D1), an antioxidant (D2), or a resin modifier (D3). When the stabilizer (D) includes the surfactant (D1) in a proportion of X % by mass, the antioxidant (D2) in a proportion of Y % by mass, and the resin modifier (D3) in a proportion of Z % by mass, with respect to a total mass of the stabilizer (D), the proportion of the stabilizer (D) to 100 parts by mass of the resin (A) is less than or equal to (5.0×X+1.5×Y+20.0×Z)/100 parts by mass.

14 Claims, No Drawings

THERMOSETTING COMPOSITION, ELECTRONIC DEVICE, AND METHOD FOR PRODUCING ELECTRONIC DEVICE

CROSS-REFERENCE OF RELATED APPLICATIONS

This application is the U.S. National Phase under 35 U.S.C. § 371 of International Patent Application No. PCT/JP2022/012694, filed on Mar. 18, 2022, which in turn claims the benefit of Japanese Patent Application No. 2021-047797, filed on Mar. 22, 2021, the entire disclosures of which Applications are incorporated by reference herein.

TECHNICAL FIELD

The present disclosure relates to thermosetting compositions, electronic devices, and methods for producing the electronic devices and specifically relates to: a thermosetting composition containing a resin, a cationic thermal polymerization initiator, a cationic photopolymerization initiator, and a stabilizer; an electronic device including the thermosetting composition, and a method for producing the electronic device including the thermosetting composition.

In an electronic apparatus, a resin composition used for bonding in manufacturing precision instruments, for example, in assembling modules such as camera modules and/or in affixing the modules to a housing, is required to have an excellent thermosetting property and be curable by heating at a relatively low temperature and for a relatively short period of time. As an example of such a resin composition, Patent Literature 1 discloses an adhesive composition including epoxidized polybutadiene, an oxetane compound, and a cationic polymerization initiator.

Moreover, such the resin composition is required to further have an excellent photocurable property allowing for simple temporary bonding by light irradiation in addition to the excellent thermosetting property. As an example of such the resin composition, Patent Literature 2 discloses a cation-curable composition containing: a cation polymerizable compound; a cationic photopolymerization initiator; and a cationic thermal polymerization initiator including an amine salt.

Such the resin composition is further required to have excellent preservation stability and a long pot life, but it is known that a resin composition containing an epoxy resin and the cationic polymerization initiator has poor preservation stability because the epoxy resin and the cationic polymerization initiator are highly reactive with each other due to heat. Moreover, when such the resin composition is used in an application requiring a high-level alignment accuracy, low shrinkage during curing is required, and therefore, an inorganic filler and the like are usually contained in such the resin composition, but it is known that when the epoxy resin and the cationic polymerization initiator further contains the inorganic filler and the like, the preservation stability further degrades. As explained above, in the conventional resin composition, in particular, when the resin composition further contains other components, for example, the inorganic filler and the like, the excellent thermosetting property and the photocurable property allowing for temporary bonding are incompatible with the long pot life.

CITATION LIST

Patent Literature

Patent Literature 1: JP 2008-169240 A
Patent Literature 2: WO 2017/094584 A1

SUMMARY OF INVENTION

It is an object of the present disclosure to provide: a thermosetting composition having an excellent thermosetting property, a photocurable property allowing for temporary bonding, and a long pot life also when the thermosetting composition contains an inorganic filler and the like; an electronic device including the thermosetting composition; and a method for producing the electronic device including the thermosetting composition.

A thermosetting composition according to an aspect of the present disclosure contains a resin (A) including at least one type of group selected from the group consisting of epoxy group, oxetane group, and vinyl ether group; a cationic thermal polymerization initiator (B); a cationic photopolymerization initiator (C); and a stabilizer (D). The stabilizer (D) includes at least one of a surfactant (D1), an antioxidant (D2), or a resin modifier (D3). When the stabilizer (D) includes the surfactant (D1) in a proportion of X % by mass, the antioxidant (D2) in a proportion of Y % by mass, and the resin modifier (D3) in a proportion of Z % by mass, with respect to a total mass of the stabilizer (D), a proportion of the stabilizer (D) with respect to 100 parts by mass of the resin (A) is less than or equal to $(5.0\times X+1.5\times Y+20.0\times Z)/100$ parts by mass.

An electronic device according to an aspect of the present disclosure includes a first component, a second component, and a hardened material layer. The hardened material layer lies between the first component and the second component to bond the first component and the second component to each other. The hardened material layer includes a hardened material of the thermosetting composition.

A method for producing an electronic device according to an aspect of the present disclosure is a method for producing an electronic device including a first component, a second component, and a hardened material layer lying between the first component and the second component to bond the first component and the second component to each other. The method includes laying the thermosetting composition between the first component and the second component, irradiating the thermosetting composition with light to temporarily bond the first component and the second component to each other, and then, heating the thermosetting composition to produce the hardened material layer.

DESCRIPTION OF EMBODIMENTS

1. Overview

First of all, how the inventors arrived at the present disclosure will be described. As a component, such as a camera module or the like, included in a precision instrument, a component having low thermal resistance is often used, and therefore, in order to avoid a dimensional change due to a temperature change at the time of thermal curing of an adhesive, a thermosetting composition which is curable at a low temperature is generally used as the adhesive. Moreover, in an application requiring a high-level alignment accuracy, the adhesive may be photocured to accomplish temporary bonding, but along with complexity, diversification, and reduced bonding areas of the precision instrument and the component included in the precision instrument, the adhesive is required to have a high temporary bonding property. Moreover, the adhesive preferably has a low shrinkage property from the standpoint of prevention of misalignment due to curing shrinkage at the time of bonding.

The inventors considered, as an adhesive which can meet these requirements, a thermosetting composition containing an epoxy resin and a cationic polymerization initiator. However, the composition containing the epoxy resin and the cationic polymerization initiator is curable at a relatively low temperature but has poor preservation stability. In addition, the inventors found that when another component, for example, an inorganic filler, is contained in the composition to achieve a low shrinkage property, the preservation stability further degrades.

Therefore, the inventors did a development in order to provide a thermosetting composition containing an epoxy resin and a cationic polymerization initiator and having an excellent thermosetting property, a high temporary bonding property, a low shrinkage property, and a long pot life, and as a result, the inventors found that these problems can be solved by containing a specific stabilizer in a specific amount or less, and thereby, the inventors accomplished the present invention.

Note that the present invention is accomplished as explained above, but when the thermosetting composition according to the present disclosure is used as an adhesive, the thermosetting composition may be used for bonding of any object, that is, the application of the thermosetting composition is not limited for bonding of the components such as the camera modules in the precision instrument. Moreover, the thermosetting composition according to the present disclosure may be applied to an application involving no temporary bonding. Moreover, the thermosetting composition according to the present disclosure is preferably used as an adhesive but may be applicable to applications other than the adhesive and may be used as a sealant of, for example, an electronic component.

A thermosetting composition (hereinafter also referred to as a composition (X)) according to an aspect of the present disclosure contains: a resin (A) (hereinafter also referred to as a resin (A)) including at least one type of group selected from the group consisting of epoxy group, oxetane group, and vinyl ether group; a cationic thermal polymerization initiator (B); a cationic photopolymerization initiator (C); and a stabilizer (D). The stabilizer (D) includes at least one of a surfactant (D1), an antioxidant (D2), or a resin modifier (D3). When the stabilizer (D) includes the surfactant (D1) in a proportion of X % by mass, the antioxidant (D2) in a proportion of Y % by mass, and the resin modifier (D3) in a proportion of Z % by mass, with respect to the total mass of the stabilizer (D), the proportion of the stabilizer (D) with respect to 100 parts by mass of the resin (A) is less than or equal to $(5.0\times X+1.5\times Y+20.0\times Z)/100$ parts by mass.

When the composition (X) is exposed to light, reaction between the resin (A) and the cationic photopolymerization initiator (C) cures the composition (X), and thereby, temporary bonding is possible. Moreover, when the composition (X) is heated, reaction between the resin (A) and the cationic thermal polymerization initiator (B) enables the composition (X) to thermally cure. Moreover, the inventors found that when a resin composition containing the resin (A), the cationic thermal polymerization initiator (B), and the cationic photopolymerization initiator (C) contains the stabilizer (D), which is a specific stabilizer and is the surfactant (D1), the antioxidant (D2), or the resin modifier (D3) in a specific amount or less, the thermosetting composition can have an excellent thermosetting property and a photocurable property allowing for temporary bonding, while the a long pot life of thermosetting composition can be achieved.

A reason why the composition (X) having the configuration described above provides the effect described above is not necessarily clear, but the following reasons are presumable. That is, the cationic thermal polymerization initiator (B) and the cationic photopolymerization initiator (C) are highly reactive with the resin (A), and therefore, the reaction slightly proceeds also at an ordinary temperature, thereby degrading the preservation stability, but when the stabilizer (D) which is specific is contained, the stabilizer (D) captures reaction initiating substances of the cationic thermal polymerization initiator (B) and the cationic photopolymerization initiator (C) to suppress the reaction from proceeding, which thus achieves a long pot life. Moreover, when a conventional thermosetting composition contains other components such as an inorganic filler and the like, further degradation of the preservation stability is observed. This is presumably because a specific functional group, a specific structure, and the like included at a surface of the inorganic filler and the like promote curing of the resin (A), thereby reducing the pot life, for which, however, the presence of the stabilizer (D), which is specific, similarly suppresses the curing from proceeding, and therefore, the composition (X) can have a long pot life.

In contrast, the inventors found that the amount of the stabilizer (D) in the composition (X) is important. That is, when more than a specific amount of the stabilizer (D) is contained, the thermosetting property and the photocurable property of the thermosetting composition degrade. Moreover, the inventors found that the specific amount differs depending on the type, that is, the surfactant (D1), the antioxidant (D2), or the resin modifier (D3), of the stabilizer (D). When two or more types of substances which are the (D1) to (D3) are used in combination as the stabilizer (D), the specific amount is the weighted average of the specific amounts of the two or more substances. As explained above, the composition (X) having the configuration described above can achieve an excellent thermosetting property, a photocurable property allowing for temporary bonding, and a long pot life. That is, the present disclosure can provide a thermosetting composition having an excellent thermosetting property, a photocurable property allowing for temporary bonding, and a long pot life even when the inorganic filler and the like is contained in the thermosetting composition.

2. Details

An embodiment of the present disclosure will be described below. Note that the following embodiment is one of various embodiments of the present disclosure. Various modifications may be made to the following embodiment depending on design as long as the object of the present disclosure is achieved.

<Thermosetting Composition>

The composition (X) according to the present embodiment contains the resin (A), the cationic thermal polymerization initiator (B), the cationic photopolymerization initiator (C), and the stabilizer (D). The composition (X) preferably contains an inorganic filler (E) and may contain a component (F), other than the components described above, within a range in which the effect of the present disclosure is not impaired. Each component will be described below.

[Resin (A)]

The resin (A) is a resin including at least one type of group selected from the group consisting of epoxy group, oxetane group, and vinyl ether group. Examples of the epoxy group include oxiranyl group, epoxycycloalkyl group such as epoxy cyclohexyl group, and epoxycycloalkyl alkyl group such as 3,4-epoxy cyclohexyl methyl group. Examples of the group including the epoxy group include epoxy alkyl group such as oxiranyl group and glycidyl group. Examples of the oxetane group include 1-oxacyclobutane-3-yl group, 3-alkyl-1-oxacyclobutane-3-yl group, and 3-haloalkyl-1-oxacyclobutane-3-yl group. Examples of the vinyl ether group include groups represented by $(R^1)(R^2)C{=}C(R^3)$—O— ($R^1$, $R^2$, and $R^3$ are each independently a hydrogen atom or an alkyl group).

The resin (A) preferably includes a compound including one or more groups of at least one type of an epoxy group, an oxetane group, or a vinyl ether group. Examples of the resin (A) include a compound including one or more epoxy groups per molecule (hereinafter also referred to as an epoxy resin (A1)), a compound including one or more oxetane groups per molecule (hereinafter also referred to as an oxetane resin (A2)), and a compound including one or more vinyl ether groups per molecule (hereinafter also referred to as a vinyl ether resin (A3)). The epoxy resin (A1) preferably includes two or more epoxy groups per molecule. The resin (A) preferably includes the epoxy resin (A1) and the oxetane resin (A2). In this case, the thermosetting property and the photocurable property of the composition (X) can be further improved.

Examples of the epoxy resin (A1) include bisphenol-type epoxy resins such as a bisphenol A-type epoxy resin, a bisphenol F-type epoxy resin, and a bisphenol S-type epoxy resin; hydrogenerated bisphenol-type epoxy resins such as a hydrogenerated bisphenol A-type epoxy resin, a hydrogenerated bisphenol F-type epoxy resin, a hydrogenerated bisphenol S-type epoxy resin; biphenyl-type epoxy resins; dicyclopentadiene-type epoxy resins; flexible structure epoxy resins; naphthalene ring-containing epoxy resins, anthracene ring-containing epoxy resins, alicyclic epoxy resins, phenol novolac epoxy resins, cresol novolac-type epoxy resins, triphenyl methane-type epoxy resins, bromine-containing epoxy resins, aliphatic epoxy resins; and triglycidyl isocyanurate, glycidyl group-containing silicone resins, and glycidyl amine-type epoxy resins. Note that the component included in the epoxy resin (A1) is not limited to the examples described above.

An epoxy equivalent of the epoxy resin (A1) is, for example, greater than or equal to 50 g/eq and less than or equal to 1000 g/eq. The epoxy equivalent is preferably greater than or equal to 70 g/eq, and more preferably greater than or equal to 100 g/eq. The epoxy equivalent is preferably less than or equal to 700 g/eq, more preferably less than or equal to 500 g/eq. The epoxy equivalent means the molecular weight of the epoxy resin (A1) per 1 equivalent of the epoxy group and is a value measured in accordance with JIS-K-7236:2001.

Examples of the oxetane resin (A2) include alkyl oxetane resins such as oxetane, 2-methyl oxetane, 2,2-dimethyl oxetane, 3-methyl oxetane, 3,3-dimethyl oxetane, and 2-ethyl hexyl oxetane; alkoxy group-containing oxetane resins such as 3-methyl-3-methoxy methyl oxetane, 3-ethyl-3-(2-ethyl hexyloxymethyl)oxetane, and 3-ethyl-3-(cyclohexyloxy)methyl oxetane; hydroxy group-containing oxetane resins such as 3-ethyl-3-hydroxy methyl oxetane; aromatic ring-containing oxetane resins such as 3-ethyl-3-(phenoxy methyl)oxetane; biphenyl oxetane resins; monofunctional oxetane resins, for example, halogen atom-containing oxetane resins such as 3,3-di(trifluoro methyl) perfluoro oxetane, 2-chloromethyl oxetane, and 3,3-bis (chloromethyl)oxetane; and bifunctional oxetane resins such as 3-ethyl-3-{[(3-ethyloxetane-3-yl)methoxy methyl]}oxetane, and polyxylylene ether having oxetane groups at its both ends. Note that the component included in the oxetane resin (A2) is not limited to the examples described above.

Examples of the vinyl ether resin (A3) include ethylene glycol divinyl ether, diethylene glycol divinyl ether, triethylene glycol divinyl ether, polyethylene glycol divinyl ether, propylene glycol divinyl ether, butylene glycol divinyl ether, hexane diol divinyl ether, bisphenol A alkylene oxide divinyl ether, and bisphenol F alkylene oxide divinyl ether. Note that the component included in the vinyl ether resin (A3) is not limited to the examples described above.

When the resin (A) includes the epoxy resin (A1) and the oxetane resin (A2), the proportion ((A2)/(A)) of the oxetane resin (A2) to the resin (A) is preferably greater than or equal to 5% by mass and less than or equal to 90% by mass. In this case, the thermosetting property and the photocurable property of the composition (X) can be further improved. This proportion is more preferably greater than or equal to 30% by mass and less than or equal to 80% by mass, and much more preferably greater than or equal to 40% by mass and less than or equal to 70% by mass.

The proportion of the resin (A) with respect to the total mass of the composition (X) is preferably greater than or equal to 5% by mass and less than or equal to 60% by mass. In this case, the thermosetting property and the photocurable property of the composition (X) can be further improved. This proportion is more preferably greater than or equal to 10% by mass and less than or equal to 50% by mass, and much more preferably greater than or equal to 20% by mass and less than or equal to 40% by mass.

[Cationic Thermal Polymerization Initiator (B)]

The cationic thermal polymerization initiator (B) is a substance which produces a proton acid or a Lewis acid which will be a catalyst causing cationic polymerization of the resin (A) by the action of heat.

Examples of the cationic thermal polymerization initiator (B) include an onium salt including a thermally degradable onium cation and a superstrong acid anion, and an aluminum complex. The "thermally degradable onium cation" means an onium cation which is decomposable by the action of heat to produce a proton.

Examples of the thermally degradable onium cation include quaternary ammonium cation, pyridinium cation, phosphonium cation, diazonium cation, diaryl or monoaryl sulfonium cation, and monoaryl iodonium cation. Examples of the superstrong acid anion include perfluoro alkyl sulfonic acid anions such as $BF_4$—, $B(C_6F_5)_4$—, $PF_6$—, $P(Rf)_n F_{6-n}$— (Rf is a perfluoro alkyl group, n is an integer of from 1 to 5), $AsF_6$—, $SbF_6$—, and $CF_3SO_3$—.

Examples of the quaternary ammonium cation include N,N,N-trimethylanilinium cation, N,N-dimethyl-N-benzyl anilinium cation, N,N-diethyl-N-benzyl anilinium cation, N,N-diethyl-N-(4-methoxy benzyl)toluidinium cation, and N-methyl-N, N-diphenyl anilinium cation.

Examples of the pyridinium cation include 1-benzyl-2-cyanopyridinium cation and 1-(naphthyl methyl)-2-cyanopyridinium cation.

Examples of the phosphonium cation include ethyl triphenyl phosphonium cation and tetra butyl phosphonium cation.

Examples of the diazonium cation include phenyl diazonium cation and naphthyl diazonium cation.

Examples of the diaryl sulfonium cation include methyl diphenyl sulfonium cation and 4-(methoxy carbonyl oxy) phenyl-phenyl-methyl sulfonium cation.

Examples of the monoaryl sulfonium cation include dimethyl phenyl sulfonium cation, (2-ethoxy-1-methyl-2-oxo-ethyl)-methyl-2-naphthalenyl sulfonium cation, 4-(methoxy carbonyl oxy)phenyl-benzyl-methyl sulfonium cation, 4-acetoxy phenyl dimethyl sulfonium cation, 4-hydroxy phenyl-benzyl-methyl sulfonium cation, 4-hydroxy phenyl-(o-methyl benzyl)-methyl sulfonium cation, and 4-hydroxy phenyl-(α-naphthyl methyl)-methyl sulfonium cation.

Examples of the monoaryl iodonium cation include methyl phenyl iodonium cation and benzyl phenyl iodonium cation.

Examples of the aluminum complex include aluminum carboxylate, aluminum alkoxide, aluminum chloride, aluminum (alkoxide)acetoacetate chelate, acetoacetonatoaluminum, and ethylacetoacetatoaluminum.

The cationic thermal polymerization initiator (B) is not particularly limited, but from the standpoint of being thermally curable at a further reduced temperature, the cationic thermal polymerization initiator (B) preferably includes the onium salt including the quaternary ammonium cation, more preferably includes a quaternary ammonium tetrakis (pentafluoro phenyl) borate salt.

The proportion of the cationic thermal polymerization initiator (B) with respect to 100 parts by mass of the resin (A) is preferably greater than or equal to 0.1 parts by mass and less than or equal to 15 parts by mass. In this case, the thermosetting property and the long pot life can be further improved. This proportion is more preferably greater than or equal to 0.5 parts by mass and less than or equal to 10 parts by mass, and much more preferably greater than or equal to 1 parts by mass and less than or equal to 5 parts by mass.

The proportion of the cationic thermal polymerization initiator (B) with respect to the total mass of the composition (X) is preferably greater than or equal to 0.05% by mass and less than or equal to 10% by mass, more preferably greater than or equal to 0.1% by mass and less than or equal to 5% by mass, and much more preferably greater than or equal to 0.4% by mass and less than or equal to 2% by mass.

[Cationic Photopolymerization Initiator (C)]

The cationic photopolymerization initiator (C) is a substance which produces a proton acid or a Lewis acid which will be a catalyst causing cationic polymerization of the resin (A) by irradiation with an active energy ray such as a visible light ray, ultraviolet light, X-ray, and an electron ray. The composition (X) contains the cationic photopolymerization initiator (C) and can thus have an excellent photocurable property. The composition (X) can have an excellent UV curable property by containing the cationic photopolymerization initiator (C) which produces the proton acid or the Lewis acid by irradiation with ultraviolet light. The composition (X) contains the cationic photopolymerization initiator (C) and thus allows for simple temporary bonding by light irradiation.

Examples of the cationic photopolymerization initiator (C) include an onium salt including a photodegradable onium cation and the superstrong acid anion, a metallocene complex, an iron-arene complex, and a non-ionic cationic photopolymerization initiator. The "photodegradable onium cation" means an onium cation which is decomposable by the action of the active energy ray to produce a proton.

Examples of the photodegradable onium cation include triaryl sulfonium cation and diaryl iodonium cation. Examples of the superstrong acid anion include perfluoro alkyl sulfonic acid anions such as $BF_4$—, $B(C_6F_5)_4$—, $PF_6$—, $P(Rf)_nF_{6-n}$— (Rf is a perfluoro alkyl group, n is an integer of from 1 to 5), $AsF_6$—, $SbF_6$—, and $CF_3SO_3$—.

Examples of the triaryl sulfonium cation include triphenyl sulfonium cation, tri(substituted phenyl)sulfonium cation, diphenyl-4-(phenylthio)phenyl sulfonium cation, and (4-methoxy phenyl)-diphenyl sulfonium cation.

Examples of the diaryl iodonium cation include diphenyl iodonium cation, di(substituted phenyl)iodonium cation, di(4-nonylphenyl)iodonium cation, (4-methoxy phenyl)-phenyl iodonium cation, and di(4-t-butyl phenyl)iodonium cation.

Examples of the iron-arene complex include xylene-cyclopentadienyl iron (II) hexafluoro antimonate, cumene-cyclopentadienyl iron (II) hexafluorophosphate, and xylene-cyclopentadienyl iron (II) tris (trifluoromethylsulfonyl) methanide.

Examples of the non-ionic cationic photopolymerization initiator (C) include nitrobenzyl ester, sulfonic acid derivative, ester phosphate, phenol sulfonic acid ester, diazonaphthoquinone, and N-hydroxy imide phosphonate.

The cationic photopolymerization initiator (C) preferably includes an onium salt including the triaryl sulfonium cation from the standpoint of having a property of absorbing ultraviolet light in an wavelength range of 300 nm or longer, more preferably includes an onium salt including the diphenyl-4-(phenylthio)phenyl sulfonium cation or the tri(substituted phenyl)sulfonium cation, and much more preferably include diphenyl-4-(phenylthio)phenyl sulfonium perfluoro alkyl group-containing fluorophosphate or tri(substituted phenyl)sulfonium tetrakis (pentafluoro phenyl)borate.

The proportion of the cationic photopolymerization initiator (C) with respect to 100 parts by mass of the resin (A) is preferably greater than or equal to 0.1 parts by mass and less than or equal to 15 parts by mass. In this case, the photocurable property and the long pot life can be further improved. This proportion is more preferably greater than or equal to 0.5 parts by mass and less than or equal to 10 parts by mass, and much more preferably greater than or equal to 1 parts by mass and less than or equal to 5 parts by mass.

The proportion of the cationic photopolymerization initiator (C) with respect to the total mass of the composition (X) is preferably greater than or equal to 0.05% by mass and less than or equal to 10% by mass, more preferably greater than or equal to 0.1% by mass and less than or equal to 5% by mass, and much more preferably greater than or equal to 0.4% by mass and less than or equal to 2% by mass.

[Stabilizer (D)]

The stabilizer (D) is a component which can be added to the thermosetting composition to improve the preservation stability. The stabilizer (D) is at least one of the surfactant (D1), the antioxidant (D2), or the resin modifier (D3). The composition (X) contains the stabilizer (D) in a specific amount or less and can thus exhibit a long pot life while having an excellent thermosetting property and a photocurable property allowing for temporary bonding. Each component of the stabilizer (D) will be described below.

[Surfactant (D1)]

The surfactant (D1) is a compound including both a hydrophilic group and a hydrophobic group per molecule. Examples of the hydrophilic group include polyoxyalkylene chain; polarity groups such as hydroxyl group and amino group; and ionic groups such as carboxylate group and quaternary ammonium group. Examples of the hydrophobic group include carbon hydride group and carbon hydride chain.

Examples of the surfactant (D1) include non-ionic surfactants, anion-based surfactants, cation-based surfactants, and amphoteric surfactants.

Examples of the non-ionic surfactant include:

- ether-type non-ionic surfactants such as polyoxyethylene higher alcohol ethers and polyoxyethylene alkyl aryl ethers;
- ester-type or ester ether-type non-ionic surfactants such as polyoxyethylene esters, sorbitan esters, and sorbitol esters;
- amine-type non-ionic surfactants such as polyoxyethylene alkyl amine;
- amide-type non-ionic surfactants such as alkyl alkanolamide; and
- ester phosphates such as alkyl ester phosphate and polyoxyethylene alkyl ether ester phosphate, and cellulose ethers. Examples of the polyoxyethylene higher alcohol ethers include polyoxyethylene isodecyl ether, polyoxyethylene lauryl ether, polyoxyethylene oleylether, polyoxyethylene alkyl ether, polyoxyethylene alkylene alkyl ether, and polyoxyethylene tribenzyl phenyl ether. Examples of the polyoxyethylene alkyl aryl ethers include polyoxyethylene octyl phenol and polyoxyethylene nonylphenol. Examples of the polyoxyethylene esters include polyethylene glycol monolaurate, polyoxyethylene glycol monostearate, and carboxylic acid ester of a polypropylene glycol ethylene oxide adduct. Examples of the sorbitan esters include: sorbitan fatty acid esters such as sorbitan monolaurate and sorbitan monooleate; and polyoxyethylene sorbitan fatty acid esters such as polyoxyethylene sorbitan monolaurate, polyoxyethylene sorbitan monooleate, polyoxyethylene sorbitan monostearate, polyoxyethylene sorbitan trioleate, and polyoxyethylene sorbitol tetraoleate. Examples of the sorbitol esters include polyoxyethylene sorbitol fatty acid ester such as polyoxyethylene sorbitol tetra oleate.

Examples of the anion-based surfactant include fatty acid salts, for example, fatty acid alkali metal salts such as sodium oleate and potassium oleate; higher alcohol sulfuric acid esters such as lauryl sodium sulfate and lauryl ammonium sulfate; alkyl aromatic sulfonates such as sodium dodecylbenzenesulfonate and sodium alkylnaphthalenesulfonate; polyoxyethylene sulfate such as polyoxyethylene alkyl phenyl ether sodium sulfate; and fluorine-containing anion-based surfactants such as naphthalene sulfonic acid formalin condensate, dialkyl sulfosuccinate, dialkyl phosphate, perfluoro alkyl carboxylate, perfluoro alkyl sulfonate, and perfluoro alkyl ester phosphate.

Examples of the cation-based surfactant include amine salts such as ethanol amine acetate, lauryl amine acetate, triethanol amine monoformate, and stearamid ethyl diethyl amine acetate; and quaternary ammonium haloid salts such as lauryl trimethyl ammonium chloride, stearyl trimethyl ammonium chloride, dilauryl dimethyl ammonium chloride, distearyl dimethyl ammonium chloride, lauryl dimethyl benzyl ammonium chloride, stearyl dimethyl benzyl ammonium chloride, tetra butyl ammonium bromide, and lauryl trimethyl ammonium bromide.

Examples of the amphoteric surfactant include fatty acid-type ampholyte ion-based surfactants such as dimethyl alkyl lauryl betaine, dimethyl alkyl stearyl betaine, lauryl dimethyl amino acetic acid betaine, and lauric acid amide propyl dimethyl amino acetic acid betaine; sulfonic acid-type ampholyte ion-base surfactants such as dimethyl alkyl sulfobetaine; and alkyl glycine.

The surfactant (D1) preferably includes the non-ionic surfactant from the standpoint of further improving the thermosetting property, the photocurable property, and the long pot life, more preferably includes at least one type of surfactant selected from an ester·ether-type surfactant, an ester-type surfactant, an ether-type surfactant, an amine-type surfactant, and an amide-type surfactant, and much more preferably include at least one type of surfactant selected from the ester·ether-type surfactant and the ester-type surfactant. Moreover, the surfactant (D1) preferably includes at least one type of compound selected from the sorbitan ester and the sorbitol ester. In this case, a long pot life is achieved by inhibiting reaction at an ordinary temperature. The surfactant (D1) more preferably includes the sorbitan ester, and much more preferably includes at least one type of compound selected from the polyoxyethylene sorbitan fatty acid ester and the sorbitan fatty acid ester.

(Antioxidant (D2))

The antioxidant (D2) is a compound which helps prevent variety of types of substances from oxidizing under an ordinary temperature or high temperature condition. Examples of the antioxidant (D2) include phenol-based antioxidants, amine-based antioxidants, phosphorus-based antioxidants, sulfur-based antioxidants, and metal compound-based antioxidants.

The phenol-based antioxidant means an antioxidant having a phenolic hydroxyl group in its molecule and is preferably a hindered phenol-based antioxidant including a substitution group bonded to at least one of two carbon atoms adjacent to a carbon atom to which a phenolic hydroxyl group of an aromatic ring is bonded. Examples of the phenol-based antioxidant include 2,4-bis(octylthiomethyl)-6-methyl phenol, ethylene bis(oxy ethylene)bis[3-(5-tert-butyl-4-hydroxy-m-tolyl)]propionate, hexamethylene bis[3-(3,5-di-tert-butyl-4-hydroxy phenyl)]propionate, thiodiethylene bis[3-(3,5-di-tert-butyl-4-hydroxy phenyl)propionate], 1,1,3-tris (2-methyl-4-hydroxy-5-tert-butyl phenyl) butane, 4,4'-butylidene-bis(3-methyl-6-tert-butyl phenol), 1,3,5-trimethyl-2,4,6-tris (3,5-di-tert-butyl-4-hydroxy benzyl)benzene, 2-tert-butyl-6-(3-tert-butyl-2-hydroxy-5-methyl benzyl)-4-methyl phenyl acrylate, (tetrakis [methylene-3-(3,5-di-tert-butyl-4-hydroxy phenyl)propionate] methane, pentaerythritol tetrakis [3-(3,5-di-tert-butyl-4-hydroxy phenyl)propionate], and octadecyl-3-(3,5-di-tert-butyl-4-hydroxy phenyl)propionate.

The amine-based antioxidant means an antioxidant including an amino group (including a substituted amino group) in its molecule. Examples of the amine-based antioxidant include naphthyl amine-based antioxidants such as 1-naphthyl amine, phenyl-1-naphthyl amine; phenylene diamine-based antioxidants such as N,N'-diisopropyl-p-phenylene diamine and N,N'-diisobutyl-p-phenylene diamine; diphenyl amine-based antioxidants such as dipyridyl amine and diphenyl amine, p,p'-di-n-butyl diphenyl amine; phenothiazine-based antioxidants such as phenothiazine and N-methyl phenothiazine; sebacic acid bis (2,2,6,6-tetra methyl-4-piperidinyl); and malonic acid [(4-methoxy phenyl)-methylene]-bis(1,2,2,6,6-pentamethyl-4-piperidinyl).

The phosphorus-based antioxidant means an antioxidant containing a phosphorus element in its molecule and is preferably a phosphite compound. Examples of the phosphorus-based antioxidant include diphenyl isooctyl phosphite, 2,2'-methylenebis (4,6-di-tert-butyl phenyl)octyl phosphite, 3,9-bis(2,6-di-tert-butyl-4-methyl phenoxy)-2,4,8,10-tetraoxa-3,9-diphosphaspiro[5.5]undecane, 10-decyl oxy-9,10-dihydro-9-oxa-10-phosphaphenanthrene-10-oxide, tetrakis (2,4-di-tert-butyl phenyl)[1,1-biphenyl]-4,4'-diylbisphosphonite, and phosphonic acid.

The sulfur-based antioxidant means an antioxidant containing a sulfur element in its molecule and is preferably a compound having a thio group. Examples of the sulfur-based antioxidant include a dialkyl thiodipropionate compound such as dilauryl thiodipropionate, dimyristyl, and distearyl; β-alkyl mercaptopropionic acid ester compounds of polyols such as tetrakis [methylene (3-dodecyl thio) propionate]methane and tetrakis [methylene (3-lauryl thio) propionate]methane; and 2-mercaptobenzimidazole.

The metal compound-based antioxidant means an antioxidant having a metal atom in its molecule and is preferably an organic metal compound. Examples of the metal compound-based antioxidant include iron octoate, organic iron compounds such as ferrocene, an organic cerium compound such as cerium naphthoate, and organic zirconium compounds such as zirconium octoate.

From the standpoint of further improving the thermosetting property, the photocurable property, and the long pot life, the antioxidant (D2) preferably includes at least one of an antioxidant containing at least one type of element selected from sulfur and phosphorus or a phenol-based antioxidant, and more preferably includes the antioxidant containing at least one type of element selected from sulfur and phosphorus.

(Resin Modifier (D3))

The resin modifier (D3) is a substance which can improve properties such as physical properties such as thermal resistance, stability, compatibility; mechanical properties such as flexibility and impact resistance; and moldability of various types of resins such as a thermoplastic resin, a thermosetting resin, and an alloy. Examples of the resin modifier (D3) include carbodiimide compounds such as an annular carbodiimide compound and a polycarbodiimide compound, polyester polyol (polyester diol), episulfide compounds, silicone-based resins, sucrose derivatives, organic acids and anhydride thereof, and olefin compounds including, for example, a (meth) acrylate compound.

The resin modifier (D3) preferably includes a carbodiimide compound from the standpoint of further improving the thermosetting property, the photocurable property, and the long pot life.

(Content of Stabilizer (D))

In order for the composition (X) to achieve all the excellent thermosetting property, the photocurable property allowing for temporary bonding, and the long pot life, the mass ratio of the stabilizer (D) to the resin (A) is importantly less than or equal to a specific value (hereinafter also referred to as a proportion (I)). When the content of the stabilizer (D) exceeds the proportion (I), the thermosetting property and the photocurable property of the composition (X) degrade. A reason for this is not necessarily clear but it is presumably because, for example, when the proportion of the stabilizer (D) exceeds the proportion (I), the stabilizer (D) suppresses thermal curing of the resin (A) by the cationic thermal polymerization initiator (B) and photocuring of the resin (A) by the cationic photopolymerization initiator (C).

The proportion (I) which is an upper limit value of the proportion of the stabilizer (D) differs depending on the type of the stabilizer (D). When only one of the (D1) to (D3) is used alone as the stabilizer (D), the proportion of the surfactant (D1) to 100 parts by mass of the resin (A) is less than or equal to 5.0 parts by mass, the proportion of the antioxidant (D2) to 100 parts by mass of the resin (A) is less than or equal to 1.5 parts by mass, and the proportion of the resin modifier (D3) to 100 parts by mass of the resin (A) is less than or equal to 20.0 parts by mass.

The upper limit of the proportion of the surfactant (D1) to 100 parts by mass of the resin (A) is preferably less than or equal to 4.0 parts by mass, more preferably less than or equal to 3.0 parts by mass, and much more preferably less than or equal to 2.7 parts by mass.

The upper limit of the proportion of the antioxidant (D2) to 100 parts by mass of the resin (A) is preferably less than or equal to 1.3 parts by mass, more preferably less than or equal to 1.0 parts by mass, and much more preferably less than or equal to 0.63 parts by mass.

The upper limit of the proportion of the resin modifier (D3) to 100 parts by mass of the resin (A) is preferably less than or equal to 15.0 parts by mass, more preferably less than or equal to 12.0 parts by mass, and much more preferably less than or equal to 10.0 parts by mass.

When two or more types of substances which are the (D1) to (D3) are used in combination as the stabilizer (D), and the proportion of the surfactant (D1) with respect to the total mass of the stabilizer (D) is X % by mass, the proportion of the antioxidant (D2) with respect to the total mass of the stabilizer (D) is Y % by mass, and the proportion of the resin modifier (D3) with respect to the total mass of the stabilizer (D) is Z % by mass ($X+Y+Z=100$), the proportion of the stabilizer (D) with respect to 100 parts by mass of the resin (A) is importantly less than or equal to $(5.0\times X+1.5\times Y+20.0\times Z)/100$ parts by mass. The proportion of the stabilizer (D) is preferably less than or equal to $(4.0\times X+1.3\times Y+15.0\times Z)/100$ parts by mass, more preferably less than or equal to $(3.0\times X+1.0\times Y+12.0\times Z)/100$ parts by mass, and much more preferably less than or equal to $(2.7\times X+0.63\times Y+10.0\times Z)/100$ parts by mass.

On the other hand, the content of the stabilizer (D) is preferably greater than or equal to the proportion shown below (hereinafter also referred to a proportion (II)). In this case, the thermosetting property, the photocurable property, and the long pot life of the composition (X) can be further improved. When the content of the stabilizer (D) is less than the proportion (II), the preservation stability of the composition (X) may degrade. The proportion (II) also differs depending on the type of the stabilizer (D).

When only one of the (D1) to (D3) is used alone as the stabilizer (D), the proportion of the surfactant (D1) with respect to 100 parts by mass of the resin (A) is preferably greater than or equal to 0.1 parts by mass, more preferably greater than or equal to 0.5 parts by mass, and much more preferably greater than or equal to 1.0 parts by mass. The proportion of the antioxidant (D2) with respect to 100 parts by mass of the resin (A) is preferably greater than or equal to 0.01 parts by mass, more preferably greater than or equal to 0.05 parts by mass, and more preferably greater than or equal to 0.1 parts by mass. The proportion of the resin modifier (D3) with respect to 100 parts by mass of the resin (A) is preferably greater than or equal to 0.2 parts by mass, more preferably greater than or equal to 1.0 parts by mass, and much more preferably greater than or equal to 2.0 parts by mass.

When two of the (D1) to (D3) are used in combination as the stabilizer (D), the proportion of the stabilizer (D) with respect to 100 parts by mass of the resin (A) is preferably greater than or equal to $(0.1\times X+0.01\times Y+0.2\times Z)/100$ parts by mass, more preferably greater than or equal to $(0.5\times X+0.05\times Y+1.0\times Z)/100$ parts by mass, and much more preferably greater than or equal to $(1.0\times X+0.1\times Y+2.0\times Z)/100$ parts by mass.

The proportion of the surfactant (D1) with respect to the total mass of the composition (X) is preferably greater than or equal to 0.10% by mass and less than or equal to 2.0% by mass, the proportion of the antioxidant (D2) is preferably greater than or equal to 0.03% by mass and less than or equal to 0.6% by mass, and the proportion of the resin modifier (D3) is preferably greater than or equal to 0.4% by mass and less than or equal to 8.0% by mass.

The proportion of the surfactant (D1) with respect to 100 parts by mass of the cationic thermal polymerization initiator (B) is preferably greater than or equal to 10 parts by mass and less than or equal to 200 parts by mass, the proportion of the antioxidant (D2) with respect to 100 parts by mass of the cationic thermal polymerization initiator (B) is preferably greater than or equal to 3 parts by mass and less than or equal to 120 parts by mass, and the proportion of the resin modifier (D3) with respect to 100 parts by mass of the cationic thermal polymerization initiator (B) is preferably greater than or equal to 40 parts by mass and less than or equal to 800 parts by mass.

The proportion of the surfactant (D1) with respect to 100 parts by mass of the cationic photopolymerization initiator (C) is preferably greater than or equal to 10 parts by mass and less than or equal to 200 parts by mass, the proportion of the antioxidant (D2) with respect to 100 parts by mass of the cationic photopolymerization initiator (C) is preferably greater than or equal to 3 parts by mass and less than or equal to 120 parts by mass, and the proportion of the resin modifier (D3) with respect to 100 parts by mass of the cationic photopolymerization initiator (C) is preferably greater than or equal to 40 parts by mass and less than or equal to 800 parts by mass.

When the composition (X) contains the inorganic filler (E), the proportion of the surfactant (D1) with respect to 100 parts by mass of the inorganic filler (E) is preferably greater than or equal to 0.2 parts by mass and less than or equal to 3.0 parts by mass, the proportion of the antioxidant (D2) with respect to 100 parts by mass of the inorganic filler (E) is preferably greater than or equal to 0.05 parts by mass and less than or equal to 1.0 parts by mass, and the proportion of the resin modifier (D3) with respect to 100 parts by mass of the inorganic filler (E) is preferably greater than or equal to 0.8 parts by mass and less than or equal to 12.0 parts by mass.

[Inorganic Filler (E)]

The composition (X) contains the inorganic filler (E) and can thus have a further reduced shrinkage ratio when the composition (X) cures.

Examples of the inorganic filler (E) include silica, alumina, barium sulfate, talc, clay, mica, aluminum hydroxide, magnesium hydroxide, calcium carbonate, magnesium carbonate, magnesium oxide, boron nitride, aluminum nitride, silicon nitride, aluminum borate, barium titanate, strontium titanate, calcium titanate, magnesium titanate, bismuth titanate, titanium oxide, barium zirconate, and calcium zirconate. Examples of the silica include crystalline silica, non-crystalline silica, amorphous silica, molten silica, and crushed silica. As the inorganic filler (E), two or more types of these substances may be used in combination.

The shape of a particle of the inorganic filler (E) is, for example, a spherical shape, a chain shape, a cocoon shape, a deformed shape, or an amorphous shape.

As the inorganic filler (E), one type of, or two or more types of, fillers may be used. Moreover, as the inorganic filler (E), one type of filler having an average particle diameter may be used, or two or more types of fillers having different average particle diameters may be used. The average particle diameter of the inorganic filler (E) is a median diameter (D50) obtained from a particle size distribution obtained from a measurement result by a laser scattering/diffraction method.

The average particle diameter of the inorganic filler (E) is preferably less than or equal to 50 μm, more preferably less than or equal to 30 μm, much more preferably less than or equal to 10 μm, and particularly preferably less than or equal to 5 μm.

When the composition (X) contains the inorganic filler (E), the proportion of the inorganic filler (E) with respect to the total mass of the composition (X) is preferably greater than 0% by mass and less than or equal to 90% by mass. This proportion is more preferably greater than or equal to 30% by mass, much more preferably greater than or equal to 50% by mass, and particularly preferably greater than or equal to 60% by mass. This proportion is more preferably less than or equal to 80% by mass, and more preferably less than or equal to 75% by mass.

[Other Components (F)]

Examples of other components (F) include thixotropy imparting agents, coupling agents, mold release agents, fire-retardant agents, flame-retardant auxiliary agents, ion trapping agents, pigment such as carbon black, colorant, low stress agents, tackifiers, and silicone flexibilizers.

Examples of the thixotropy imparting agent include fumed silica, elastomer particles, hydrogenerated castor oil, modified urea, and fatty acid amide.

When the composition (X) contains the inorganic filler (E) and the coupling agent, the inorganic filler (E) is surface treated by the coupling agent, thereby improving affinity with the resin (A). Examples of the coupling agent include silane coupling agents, titanate coupling agents, aluminum coupling agents, and aluminum/zirconium coupling agents. Examples of the silane coupling agent include glycidoxy silane such as γ-glycidoxypropyl trimethoxy silane, γ-glycidoxypropyl methyl diethoxy silane, and β-(3,4-epoxy cyclohexyl) ethyl trimethoxy silane; amino silane such as N-β(amino ethyl)-γ-amino propyl trimethoxy silane, γ-amino propyl triethoxysilane, and N-phenyl-γ-amino propyl trimethoxy silane; alkyl silane; ureido silane; and vinyl silane. When the composition (X) contains the inorganic filler (E) and the coupling agent, the proportion of the coupling agent with respect to 100 parts by mass of the inorganic filler (E) is, for example, greater than or equal to 0.01 parts by mass and less than or equal to 2 parts by mass.

When the composition (X) contains other components (F), the proportion of the components (F) with respect to the total mass of the composition (X) is, for example, greater than or equal to 0.01% by mass and less than or equal to 10% by mass.

(Properties)

The thermosetting property of the composition (X) can be evaluated by, for example, based on shear bond strength (MPa) between an adherend and a hardened material obtained by thermally curing a coating film of the composition (X) on the adherend under a prescribed condition. The shear bond strength is preferably greater than or equal to 6 MPa, more preferably greater than or equal to 8 MPa, much more preferably greater than or equal to 10 MPa, and particularly preferably greater than or equal to 11 MPa. The upper limit value of the shear bond strength is not particularly limited but is, for example, 15 MPa.

The photocurable property of the composition (X) can be evaluated by, for example, based on shear bond strength (MPa) between an adherend and a hardened material obtained by photocuring a coating film of the composition (X) on the adherend under a prescribed condition. The shear bond strength is preferably greater than or equal to 6 MPa, more preferably greater than or equal to 8 MPa, much more preferably greater than or equal to 10 MPa, and particularly preferably greater than or equal to 11 MPa. The upper limit value of the shear bond strength is not particularly limited but is, for example, 15 MPa.

The preservation stability (pot life) of the composition (X) can be evaluated, for example, based on a time (time (I)) which the viscosity of the composition (X) stored at a prescribed temperature takes to increase by 1.5 or more times from an initial viscosity of the composition (X). The time (I) is preferably longer than 2 days, more preferably longer than or equal to 5 days, and much more preferably longer than or equal to 7 days. The upper limit value of the time (I) is not particularly limited, but is, for example, 30 days.

The shrinkage ratio of the composition (X) at the time of curing (curing shrinkage) is preferably less than or equal to 5%, more preferably less than or equal to 3%, and much more preferably less than or equal to 2%. The lower limit value of the curing shrinkage is not particularly limited but is, for example, 0.5%.

Note that details of measurement method of the thermosetting property, the photocurable property, the preservation stability, and the curing shrinkage will be explained later under Example.

The composition (X) of the present embodiment is cured, thereby obtaining a hardened material. The hardened material is obtained by, for example, curing the composition (X) by heat or light irradiation. A heating temperature is, for example, higher than or equal to 50° C. and lower than or equal to 200° C. A heating time is, for example, longer than or equal to 10 seconds and shorter than or equal to 5 hours. Light for irradiation is, for example, ultraviolet light. The integrated illuminance of the light for irradiation is, for example, greater than or equal to 10 $mJ/cm^2$ and less than or equal to 10000 $mJ/cm^2$.

Such the hardened material of the composition (X) is, for example, laid between components during production of an electronic device and is suitably used, for example, for formation of a layer which bonds the components to each other, or as a sealing material and the like for sealing electronic components.

<Adhesive>

The adhesive of the present embodiment is an adhesive including the composition (X). As described above, the composition (X) can achieve the excellent thermosetting property and the photocurable property, and the long pot life, and therefore, the adhesive of the present embodiment is suitably used for bonding, for example, in assembling modules such as camera modules in electronic apparatuses and the like and in affixing to housings.

<Electronic Device>

An electronic device (hereinafter also referred to as an electronic device (Y)) of the present embodiment includes a first component (hereinafter also referred to a component (1)), a second component (hereinafter also referred to as a component (2)), and a hardened material layer (hereinafter also referred to as a hardened material layer (h)). The hardened material layer (h) lies between the component (1) and the component (2) and bonds the component (1) and the component (2) to each other. The hardened material layer (h) includes a hardened material of the composition (X).

The electronic device (Y) includes the composition (X) which allows for simple temporary bonding, and therefore, high-level alignment adjustment is possible.

The electronic device (Y) includes the component (1), the component (2), and the hardened material layer (h) which lies between the component (1) and the component (2) and which is produced by curing the composition (X). The number of components to be bonded is not limited to two, but three or more components may be bonded. Moreover, the number of components included in the electronic device (Y) is not limited to two, but three or more components may be included in the electronic device (Y).

The component (1) and the component (2) are not particularly limited but are, for example, substrates in an electronic device or electronic apparatuses. The electronic device (Y) is not particularly limited as long as it is produced by bonding a plurality of components by the composition (X).

<Method for Producing Electronic Device>

A method for producing an electronic device of the present embodiment is a method for producing (hereinafter also referred to as a production method (Z)) the electronic device (Y) described above. The production method (Z) includes laying the composition (X) between the component (1) and the component (2), irradiating the composition (X) with light to temporarily bond the component (1) and the component (2) to each other, and then, heating the composition (X) to produce a hardened material layer.

The production method (Z) more simply temporarily bond components to each other by light irradiation and then performs thermal curing and can thus be suitably used in electronic devices requiring high-level alignment accuracy.

In the production of the electronic device (Y), first of all, the composition (X) is laid between the component (1) and the component (2). A method for laying the composition (X) is not particularly limited, but examples of the method include a method of bringing the components in close contact with each other and then applying the composition (X) to a part at which the components are in close contact with each other, and a method of applying the composition (X) to respective parts of the components, and then bringing the respective parts into close contact with each other.

Then, the composition (X) is irradiated with light. Thus, the component (1) and the component (2) are temporarily bonded to each other. Light for irradiation is accordingly selected based on the type and the like of the cationic photopolymerization initiator (C) included in the composition (X), but is preferably, for example, ultraviolet light having a peak wavelength of longer than or equal to 300 nm and shorter than or equal to 400 nm, and the peak wavelength is more preferably 365 nm. The integrated illuminance of light for irradiation is, for example, greater than or equal to 10 $mJ/cm^2$ and less than or equal to 10000 $mJ/cm^2$, and is preferably greater than or equal to 100 $mJ/cm^2$ and less than or equal to 3000 $mJ/cm^2$.

Then, the composition (X) lying between the component (1) and the component (2) thus temporarily bonded to each other is heated. This thermally cures the composition (X), thereby producing the hardened material layer (h). Producing the hardened material layer (h) more tightly bonds the component (1) and the component (2) of the electronic device (Y) to each other. Heating conditions are accordingly selected based on, for example, the type of the cationic thermal polymerization initiator (B) contained in the composition (X). The heating temperature is, for example, higher than or equal to 50° C. and lower than or equal to 200° C., preferably higher than or equal to 70° C. and lower than or equal to 150° C., and more preferably higher than or equal to 80° C. and lower than or equal to 120° C. The heating time is, for example, longer than or equal to 10 seconds and shorter than or equal to 5 hours, preferably longer than or equal to 10 minutes and shorter than or equal to 3 hours, and more preferably longer than or equal to 30 minutes and shorter than or equal to 2 hours. Thus, the electronic device (Y) is produced.

Examples

The present disclosure will be specifically described with reference to examples below, but the present disclosure is not limited to the examples.

<Preparation of Composition>

Raw materials shown in Table 1 were mixed, thereby preparing compositions. Details of the raw materials shown in Table 1 are as follows.

Resin (A)

- A1-1: YX-8000 (hydrogenerated bisphenol A-type epoxy resin (glycidyl type)) manufactured by Mitsubishi Chemical Corporation.
- A1-2: YD-8125 (bisphenol A-type epoxy resin (glycidyl type)) manufactured by NIPPON STEEL Chemical & Material Co., Ltd.
- A1-3: EP-4088S (dicyclopentadiene-type epoxy resin (glycidyl type)) manufactured by ADEKA CORPORATION.
- A1-4: CELLOXIDE 2021P (alicyclic epoxy resin) manufactured by Daicel Corporation. 3',4'-epoxy cyclohexyl methyl-3,4-epoxy cyclohexane carboxylate.
- A2-1: OXT-211 (aromatic ring-containing oxetane resin) manufactured by Toagosei Company, Limited. 3-ethyl-3-(phenoxy methyl)oxetane.

Cationic Thermal Polymerization Initiator (B)

- B-1: K-PURE CXC-1821 manufactured by King Industries. Quaternary ammonium tetra (pentafluoro phenyl) borate.

Cationic Photopolymerization Initiator (C)

- C-1: CPI-210S manufactured by San-Apro Ltd. Diphenyl-phenylthiophenyl sulfonium salt.
- C-2: Irgacure290 manufactured by BASF. Triaryl sulfonium tetrakis (pentafluoro phenyl)borate.

Stabilizer (D)

Surfactant (D1)

- D1-1: Non-ionic surfactant (ester•ether type). RHEODOL TW-L120 manufactured by Kao Corporation. Polyoxyethylene sorbitan monolaurate.
- D1-2: Non-ionic surfactant (ester•ether type). RHEODOL TW-O106V manufactured by Kao Corporation. Polyoxyethylene sorbitan monooleate.
- D1-3: Non-ionic surfactant (ester•ether type). RHEODOL TW-O320V manufactured by Kao Corporation. Polyoxyethylene sorbitan trioleate.
- D1-4: Non-ionic surfactant (ester•ether type). RHEODOL 430V manufactured by Kao Corporation. Tetra oleic acid polyoxyethylene sorbit.
- D1-5: Non-ionic surfactant (ester type). RHEODOL SP-L10 manufactured by Kao Corporation. Sorbitan fatty acid ester.
- D1-6: Non-ionic surfactant (ester type). EMANON 1112 manufactured by Kao Corporation. Polyethylene glycol monolaurate.
- D1-7: Non-ionic surfactant (amine-type). AMIET 102 manufactured by Kao Corporation. Polyoxyethylene alkyl amine.
- D1-8: Non-ionic surfactant (ether type). EMULGEN 102 KG manufactured by Kao Corporation. Polyoxyethylene lauryl ether.
- D1-9: Non-ionic surfactant (ether type). EMULGEN B-66 manufactured by Kao Corporation. Polyoxyethylene tribenzyl phenyl ether.
- D1-10: Non-ionic surfactant (ether type).
- EMULGEN 408 manufactured by Kao Corporation. Polyoxyethylene oleylether.

(Antioxidant (D2))

- D2-1: Hindered phenol-based antioxidant (sulfur-containing). Irganox1520 L manufactured by BASF Japan Ltd. 2,4-bis(octylthiomethyl)-6-methyl phenol.
- D2-2: Hindered phenol-based antioxidant (sulfur-containing). Irganox1035 manufactured by BASF Japan Ltd. Thiodiethylene bis[3-(3,5-di-tert-butyl-4-hydroxy phenyl)propionate].
- D2-3: Phosphite-based antioxidant (phosphorus-containing). ADK STAB PEP-36 manufactured by ADEKA Corporation. 3,9-Bis(2,6-di-tert-butyl-4-methylphenoxy)-2,4,8,10-tetraoxa-3,9-diphosphaspiro[5.5]undecane
- D2-4: Hindered phenol-based antioxidant. Irganox1010 manufactured by BASF Japan Ltd. Pentaerythritoltetrakis(3-(3,5-di-tert-butyl-4-hydroxyphenyl)propionate)
- D2-5: Hindered phenol-based antioxidant. Irganox245 manufactured by BASF Japan Ltd. Ethylene bis(oxyethylene)bis-(3-(5-tert-butyl-4-hydroxy-m-tolyl)propionate)
- D2-6: Hindered phenol-based antioxidant. Irganox259 manufactured by BASF Japan Ltd. Hexamethylene bis(3-(3,5-di-tert-butyl-4-hydroxyphenyl)propionate)

(Resin Modifier (D3))

- D3-1: Carbosista TCC-FP20M manufactured by TEIJIN LIMITED. annular carbodiimide compound.
- D3-2: CARBODILITE V-05 manufactured by Nisshinbo Chemical Inc. Polycarbodiimide compound.
- D3-3: FLEXOREZ 188 manufactured by King Industries. Polyester polyol (polyester diol).
- D3-4: FLEXOREZ 148 manufactured by King Industries. polyester polyol (polyester diol).

Inorganic Filler (E)

- E-1: Si filler. SE5050 manufactured by ADMATECHS COMPANY LIMITED.
- E-2: Si filler. FB-300MDC manufactured by Denka Company Limited.
- E-3: Si filler. UHV-500S manufactured by TATSUMORI LTD.

Other Components (F)

- F-1: Thixotropy imparting agent: fumed silica. AEROSIL RY200 manufactured by NIPPON AEROSIL CO., LTD.
- F-2: Silane coupling agent. Silquest A-187J manufactured by MOMENTIVE.

<Evaluation>

[Thermosetting Property]

The composition was applied to an adherend made of polycarbonate, thereby producing a coating film having a diameter of 5 mm and a thickness of 0.5 mm. The coating film was thermally cured by heating at 100° C. for 1 hour, thereby producing a hardened material. The shear bond strength of the hardened material with respect to the adherend was measured by using a shear tester. The thermosetting property can be evaluated as “good” when the shear bond strength is greater than or equal to 6 MPa, and the thermosetting property can be evaluated as “poor” when the shear bond strength is less than 6 MPa.

[Photocurable Property (UV Curability)]

The composition was applied to an adherend made of polycarbonate, thereby producing a coating film having a diameter of 5 mm and a thickness of 0.5 mm. The coating film was irradiated with ultraviolet light having a peak wavelength of 365 nm under a condition with an integrated illuminance of 1500 mJ/cm$^2$, thereby producing a hardened material. The shear bond strength of the hardened material with respect to the adherend was measured by using a shear tester. The UV curability can be evaluated as "good" when the shear bond strength is greater than or equal to 6 MPa, and the UV curability can be evaluated as "poor" when the shear bond strength is less than 6 MPa.

[Long Pot Life]

The composition was put in a light-resistant container, which was stored in a water tank at 25° C., and in this state, the viscosity was continuously measured. The viscosity was measured by using a B-type viscometer under conditions with a temperature of 25° C. and a rotation speed of 50 rpm. A time (time (I)) which the viscosity takes to increase to 1.5 or more times an initial viscosity was obtained, and the long pot life was evaluated based on the following criteria.

S: Time (I) was longer than 7 days.

A: Time (I) was longer than 3 days and shorter than or equal to 7 days.

B: Time (I) was longer than or equal to 2 days and shorter than or equal to 3 days.

C: Time (I) was shorter than 2 days.

[Curing Shrinkage]

A release film made of polyethylene terephthalate was disposed on a glass pane. On the release film, a spacer made of silicone was disposed. The spacer has a dimension of 5 mm×150 mm in plan view, has a thickness of 0.5 mm, and has a space. The composition was poured into the space in the spacer. Then, a release film made of polyethylene terephthalate was disposed on a spacer upper surface. On the release film, a glass pane was disposed. From above the glass pane on an upper side toward the composition in the space, ultraviolet light having a peak wavelength of 365 nm was radiated under a condition with an integrated illuminance of 1500 mJ/cm$^2$. Then, the composition was thermally cured by heating at 100° C. for 1 hour, thereby producing a hardened material. The specific gravity was measured by using gas pycnometer (manufactured by Anton Paar GmbH) before and after the composition was cured, and the curing shrinkage was calculated based on the formula below. curing shrinkage (%)=(specific gravity of hardened material-specific gravity before curing)×100/specific gravity of hardened material.

TABLE 1

| | | | Example | | | | | | | |
|---|---|---|---|---|---|---|---|---|---|---|
| Amount of Incorporation (part by mass) | | | 1 | 2 | 3 | 4 | 5 | 6 | 7 | 8 |
| (A) Component | | A1-1 | 13.5 | 13.4 | 13.6 | 13.5 | 13.5 | | | |
| | | A1-2 | | | | | | 13.46 | | |
| | | A1-3 | | | | | | | 13.46 | |
| | | A1-4 | 2.59 | 2.67 | 2.71 | 2.69 | 2.69 | 2.69 | 2.69 | 16.15 |
| | | A2-1 | 17.5 | 17.4 | 17.7 | 17.5 | 17.5 | 17.5 | 17.5 | 17.5 |
| (B) Component | | B-1 | 0.98 | 0.97 | 0.98 | 0.98 | 0.98 | 0.98 | 0.98 | 0.98 |
| (C) Component | | C-1 | 0.98 | 0.97 | 0.98 | 0.98 | 0.98 | 0.98 | 0.98 | 0.98 |
| | | C-2 | | | | | | | | |
| (D) Component | Surfactant (D1) | D1-1 | 0.91 | 1.67 | 0.17 | 0.91 | 0.91 | 0.91 | 0.91 | 0.91 |
| | | D1-2 | | | | | | | | |
| | | D1-3 | | | | | | | | |
| | | D1-4 | | | | | | | | |
| | | D1-5 | | | | | | | | |
| | | D1-6 | | | | | | | | |
| | | D1-7 | | | | | | | | |
| | | D1-8 | | | | | | | | |
| | | D1-9 | | | | | | | | |
| | | D1-10 | | | | | | | | |
| | Antioxidant (D2) | D2-1 | | | | | | | | |
| | | D2-2 | | | | | | | | |
| | | D2-3 | | | | | | | | |
| | | D2-4 | | | | | | | | |
| | | D2-5 | | | | | | | | |
| | | D2-6 | | | | | | | | |
| | Resin Modifier (D3 | D3-1 | | | | | | | | |
| | | D3-2 | | | | | | | | |
| | | D3-3 | | | | | | | | |
| | | D3-4 | | | | | | | | |
| (E) Component | | E-1 | 62.2 | 61.7 | 62.7 | | | 62.2 | 62.2 | 62.2 |
| | | E-2 | | | | 62.2 | | | | |
| | | E-3 | | | | | 62.2 | | | |
| (F) Component | | F-1 | | | | | | | | |
| | | F-2 | 1.26 | 1.25 | 1.27 | 1.26 | 1.26 | 1.26 | 1.26 | 1.26 |
| Total | | | 100.0 | 100.0 | 100.0 | 100.0 | 100.0 | 100.0 | 100.0 | 100.0 |
| (A) Component Proportion (mass %) | | | 34% | 33% | 34% | 34% | 34% | 34% | 34% | 34% |
| (B) Component Ratio [phr] | | | 2.9 | 2.9 | 2.9 | 2.9 | 2.9 | 2.9 | 2.9 | 2.9 |
| (C) Component Ratio [phr] | | | 2.9 | 2.9 | 2.9 | 2.9 | 2.9 | 2.9 | 2.9 | 2.9 |
| (D) Part by Mass:100 Parts by Mass of (A) | | | 2.7 | 5.0 | 0.50 | 2.7 | 2.7 | 2.7 | 2.7 | 2.7 |

TABLE 1-continued

| | | | | | | | | | | |
|---|---|---|---|---|---|---|---|---|---|---|
| (E) Component Proportion (mass %) | | | 62% | 62% | 63% | 62% | 62% | 62% | 62% | 62% |
| Evaluation | Thermosetting Property:Bond Strength [MPa] | | 10 | 8 | 11 | 10 | 10 | 11 | 11 | 9 |
| | UV Curablity:Bond Strength [MPa] | | 10 | 8 | 11 | 10 | 10 | 11 | 11 | 9 |
| | Long Pot Life | Time (I) | >7 Days | >7 Days | 4 Days | >7 Days | >7 Days | >7 Days | >7 Days | 4 Days |
| | | Evaluation | S | S | A | S | S | S | S | A |
| | Curing Shrinkage (%) | | 2.0 | 2.0 | 2.0 | 2.0 | 2.0 | 2.0 | 2.0 | 2.0 |

| | | | Example | | | | | | | |
|---|---|---|---|---|---|---|---|---|---|---|
| Amount of Incorporation (part by mass) | | | 9 | 10 | 11 | 12 | 13 | 14 | 15 | 16 |
| (A) Component | | A1-1 | 7.1 | 24.9 | 13.5 | 13.5 | 13.5 | 13.5 | 13.5 | 13.5 |
| | | A1-2 | | | | | | | | |
| | | A1-3 | | | | | | | | |
| | | A1-4 | 1.42 | 4.98 | 2.69 | 2.59 | 2.69 | 2.69 | 2.69 | 2.69 |
| | | A2-1 | 9.3 | 32.5 | 17.5 | 17.5 | 17.5 | 17.5 | 17.5 | 17.5 |
| (B) Component | | B-1 | 0.52 | 1.81 | 0.98 | 0.98 | 0.98 | 0.98 | 0.98 | 0.98 |
| (C) Component | | C-1 | 0.52 | 1.81 | 0.98 | 0.98 | 0.98 | 0.98 | 0.98 | 0.98 |
| | | C-2 | | | | | | | | |
| (D) Component | Surfactant (D1) | D1-1 | 0.48 | 1.68 | | | | | | |
| | | D1-2 | | | 0.91 | | | | | |
| | | D1-3 | | | | 0.91 | | | | |
| | | D1-4 | | | | | 0.91 | | | |
| | | D1-5 | | | | | | 0.91 | | |
| | | D1-6 | | | | | | | 0.91 | |
| | | D1-7 | | | | | | | | 0.91 |
| | | D1-8 | | | | | | | | |
| | | D1-9 | | | | | | | | |
| | | D1-10 | | | | | | | | |
| | Antioxidant (D2) | D2-1 | | | | | | | | |
| | | D2-2 | | | | | | | | |
| | | D2-3 | | | | | | | | |
| | | D2-4 | | | | | | | | |
| | | D2-5 | | | | | | | | |
| | | D2-6 | | | | | | | | |
| | Resin Modifier (D3 | D3-1 | | | | | | | | |
| | | D3-2 | | | | | | | | |
| | | D3-3 | | | | | | | | |
| | | D3-4 | | | | | | | | |
| (E) Component | | E-1 | 80.0 | 30.0 | 62.2 | 62.2 | 62.2 | 62.2 | 62.2 | 62.2 |
| | | E-2 | | | | | | | | |
| | | E-3 | | | | | | | | |
| (F) Component | | F-1 | | | | | | | | |
| | | F-2 | 0.67 | 2.34 | 1.26 | 1.26 | 1.26 | 1.26 | 1.26 | 1.26 |
| Total | | | 100.0 | 100.0 | 100.0 | 100.0 | 100.0 | 100.0 | 100.0 | 100.0 |
| (A) Component Proportion (mass %) | | | 18% | 62% | 34% | 34% | 34% | 34% | 34% | 34% |
| (B) Component Ratio [phr] | | | 2.9 | 2.9 | 2.9 | 2.9 | 2.9 | 2.9 | 2.9 | 2.9 |
| (C) Component Ratio [phr] | | | 2.9 | 2.9 | 2.9 | 2.9 | 2.9 | 2.9 | 2.9 | 2.9 |
| (D) Part by Mass:100 Parts by Mass of (A) | | | 2.7 | 2.7 | 2.7 | 2.7 | 2.7 | 2.7 | 2.7 | 2.7 |
| (E) Component Proportion (mass %) | | | 80% | 30% | 62% | 62% | 62% | 62% | 62% | 62% |
| Evaluation | Thermosetting Property:Bond Strength [MPa] | | 10 | 7 | 10 | 10 | 10 | 10 | 10 | 10 |
| | UV Curablity:Bond Strength [MPa] | | 10 | 7 | 10 | 10 | 10 | 10 | 10 | 10 |
| | Long Pot Life | Time (I) | >7 Days | >7 Days | >7 Days | >7 Days | >7 Days | >7 Days | 2 Days | 3 Days |
| | | Evaluation | S | S | S | S | S | S | B | B |
| | Curing Shrinkage (%) | | 1.5 | 4.0 | 2.0 | 2.0 | 2.0 | 2.0 | 2.0 | 2.0 |

| | | Example | | | | | | |
|---|---|---|---|---|---|---|---|---|
| Amount of Incorporation (part by mass) | | 17 | 18 | 19 | 20 | 21 | 22 | 23 |
| (A) Component | A1-1 | 13.5 | 13.5 | 13.5 | | | | |
| | A1-2 | | | | 4.50 | 4.52 | 4.50 | 4.52 |
| | A1-3 | | | | | | | |
| | A1-4 | 2.59 | 2.69 | 2.69 | 4.82 | 4.84 | 4.82 | 4.84 |
| | A2-1 | 17.5 | 17.5 | 17.5 | 22.5 | 22.6 | 22.5 | 22.6 |
| (B) Component | B-1 | 0.98 | 0.98 | 0.98 | 0.56 | 0.57 | 0.56 | 0.57 |
| (C) Component | C-1 | 0.98 | 0.98 | 0.98 | | | | |
| | C-2 | | | | 0.56 | 0.57 | 0.56 | 0.57 |

TABLE 1-continued

| | | | | | | | | | |
|---|---|---|---|---|---|---|---|---|---|
| (D) Component | Surfactant (D1) | D1-1 | | | | | | | |
| | | D1-2 | | | | | | | |
| | | D1-3 | | | | | | | |
| | | D1-4 | | | | | | | |
| | | D1-5 | | | | | | | |
| | | D1-6 | | | | | | | |
| | | D1-7 | | | | | | | |
| | | D1-8 | 0.91 | | | | | | |
| | | D1-9 | | 0.91 | | | | | |
| | | D1-10 | | | 0.91 | | | | |
| | Antioxidant (D2) | D2-1 | | | | 0.48 | 0.02 | | |
| | | D2-2 | | | | | | 0.48 | 0.02 |
| | | D2-3 | | | | | | | |
| | | D2-4 | | | | | | | |
| | | D2-5 | | | | | | | |
| | | D2-6 | | | | | | | |
| | Resin Modifier (D3 | D3-1 | | | | | | | |
| | | D3-2 | | | | | | | |
| | | D3-3 | | | | | | | |
| | | D3-4 | | | | | | | |
| (E) Component | | E-1 | 62.2 | 62.2 | 62.2 | | | | |
| | | E-2 | | | | | | | |
| | | E-3 | | | | 62.1 | 62.4 | 62.1 | 62.4 |
| (F) Component | | F-1 | | | | 4.0 | 4.0 | 4.0 | 4.0 |
| | | F-2 | 1.26 | 1.26 | 1.26 | 0.42 | 0.42 | 0.42 | 0.42 |
| Total | | | 100.0 | 100.0 | 100.0 | 100.0 | 100.0 | 100.0 | 100.0 |
| (A) Component Proportion (mass %) | | | 34% | 34% | 34% | 32% | 32% | 32% | 32% |
| (B) Component Ratio [phr] | | | 2.9 | 2.9 | 2.9 | 1.8 | 1.8 | 1.8 | 1.8 |
| (C) Component Ratio [phr] | | | 2.9 | 2.9 | 2.9 | 1.8 | 1.8 | 1.8 | 1.8 |
| (D) Part by Mass:100 Parts by Mass of (A) | | | 2.7 | 2.7 | 2.7 | 1.5 | 0.05 | 1.5 | 0.05 |
| (E) Component Proportion (mass %) | | | 62% | 62% | 62% | 62% | 62% | 62% | 62% |
| Evaluation | Thermosetting Property:Bond Strength [MPa] | | 10 | 10 | 10 | 8 | 12 | 8 | 12 |
| | UV Curablity:Bond Strength [MPa] | | 10 | 10 | 10 | 8 | 12 | 8 | 12 |
| | Long Pot Life | Time (I) | 2 Days | 3 Days | 3 Days | >7 Days | 5 Days | >7 Days | 5 Days |
| | | Evaluation | B | B | B | S | A | S | A |
| | Curing Shrinkage (%) | | 2.0 | 2.0 | 2.0 | 2.0 | 2.0 | 2.0 | 2.0 |

TABLE 2

| Amount of Incorporation (part by mass) | | | Example 24 | 25 | 26 | 27 | 28 | 29 | 30 | 31 |
|---|---|---|---|---|---|---|---|---|---|---|
| (A) Component | | A1-1 | | | | | | | | |
| | | A1-2 | 4.50 | 4.52 | 4.50 | 4.52 | 4.50 | 4.52 | 4.50 | 4.52 |
| | | A1-3 | | | | | | | | |
| | | A1-4 | 4.82 | 4.84 | 4.82 | 4.84 | 4.82 | 4.84 | 4.82 | 4.84 |
| | | A2-1 | 22.5 | 22.6 | 22.5 | 22.6 | 22.5 | 22.6 | 22.5 | 22.6 |
| (B) Component | | B-1 | 0.56 | 0.57 | 0.56 | 0.57 | 0.56 | 0.57 | 0.56 | 0.57 |
| (C) Component | | C-1 | | | | | | | | |
| | | C-2 | 0.56 | 0.57 | 0.56 | 0.57 | 0.56 | 0.57 | 0.56 | 0.57 |
| (D) Component | Surfactant (D1) | D1-1 | | | | | | | | |
| | | D1-2 | | | | | | | | |
| | | D1-3 | | | | | | | | |
| | | D1-4 | | | | | | | | |
| | | D1-5 | | | | | | | | |
| | | D1-6 | | | | | | | | |
| | | D1-7 | | | | | | | | |
| | | D1-8 | | | | | | | | |
| | | D1-9 | | | | | | | | |
| | | D1-10 | | | | | | | | |
| | Antioxidant (D2) | D2-1 | | | | | | | | |
| | | D2-2 | | | | | | | | |
| | | D2-3 | 0.48 | 0.02 | | | | | | |
| | | D2-4 | | | 0.48 | 0.02 | | | | |
| | | D2-5 | | | | | 0.48 | 0.02 | | |
| | | D2-6 | | | | | | | 0.48 | 0.02 |
| | Resin Modifier (D3) | D3-1 | | | | | | | | |
| | | D3-2 | | | | | | | | |
| | | D3-3 | | | | | | | | |

TABLE 2-continued

| | | | | | | | | | | |
|---|---|---|---|---|---|---|---|---|---|---|
| | | D3-4 | | | | | | | | |
| (E) Component | | E-1 | | | | | | | | |
| | | E-2 | | | | | | | | |
| | | E-3 | 62.1 | 62.4 | 62.1 | 62.4 | 62.1 | 62.4 | 62.1 | 62.4 |
| (F) Component | | F-1 | 4.0 | 4.0 | 4.0 | 4.0 | 4.0 | 4.0 | 4.0 | 4.0 |
| | | F-2 | 0.42 | 0.42 | 0.42 | 0.42 | 0.42 | 0.42 | 0.42 | 0.42 |
| Total | | | 100.0 | 100.0 | 100.0 | 100.0 | 100.0 | 100.0 | 100.0 | 100.0 |
| (A) Component Proportion (mass %) | | | 32% | 32% | 32% | 32% | 32% | 32% | 32% | 32% |
| (B) Component Ratio [phr] | | | 1.8 | 1.8 | 1.8 | 1.8 | 1.8 | 1.8 | 1.8 | 1.8 |
| (C) Component Ratio [phr] | | | 1.8 | 1.8 | 1.8 | 1.8 | 1.8 | 1.8 | 1.8 | 1.8 |
| (D) Part by Mass:100 Parts by Mass of (A) | | | 1.5 | 0.05 | 1.5 | 0.05 | 1.5 | 0.05 | 1.5 | 0.05 |
| (E) Component Proportion (mass %) | | | 62% | 62% | 62% | 62% | 62% | 62% | 62% | 62% |
| Evaluation | Thermosetting Property:Bond Strength [MPa] | | 8 | 12 | 8 | 9 | 8 | 9 | 8 | 9 |
| | UV Curability:Bond Strength [MPa] | | 8 | 12 | 8 | 9 | 8 | 9 | 8 | 9 |
| | Long Pot Life | Time (I) | >7 Days | 5 Days | 3 Days | 2 Days | 3 Days | 2 Days | 3 Days | 2 Days |
| | | Evaluation | S | A | B | B | B | B | B | B |
| | Curing Shrinkage (%) | | 2.0 | 2.0 | 2.0 | 2.0 | 2.0 | 2.0 | 2.0 | 2.0 |

| | | | Example | | | | | | Comparative Example | |
|---|---|---|---|---|---|---|---|---|---|---|
| Amount of Incorporation (part by mass) | | | 32 | 33 | 34 | 35 | 36 | 37 | 1 | 2 |
| (A) Component | | A1-1 | | | | | | | 36.5 | 13.6 |
| | | A1-2 | 4.25 | 4.50 | 4.25 | 4.50 | 4.25 | 4.25 | | |
| | | A1-3 | | | | | | | | |
| | | A1-4 | 4.55 | 4.83 | 4.55 | 4.83 | 4.55 | 4.55 | 7.30 | 2.72 |
| | | A2-1 | 21.3 | 22.6 | 21.3 | 22.6 | 21.3 | 21.3 | 47.5 | 17.7 |
| (B) Component | | B-1 | 0.53 | 0.56 | 0.53 | 0.56 | 0.53 | 0.53 | 2.64 | 0.98 |
| (C) Component | | C-1 | | | | | | | 2.64 | 0.98 |
| | | C-2 | 0.53 | 0.56 | 0.53 | 0.56 | 0.53 | 0.53 | | |
| (D) Component | Surfactant (D1) | D1-1 | | | | | | | | |
| | | D1-2 | | | | | | | | |
| | | D1-3 | | | | | | | | |
| | | D1-4 | | | | | | | | |
| | | D1-5 | | | | | | | | |
| | | D1-6 | | | | | | | | |
| | | D1-7 | | | | | | | | |
| | | D1-8 | | | | | | | | |
| | | D1-9 | | | | | | | | |
| | | D1-10 | | | | | | | | |
| | Antioxidant (D2) | D2-1 | | | | | | | | |
| | | D2-2 | | | | | | | | |
| | | D2-3 | | | | | | | | |
| | | D2-4 | | | | | | | | |
| | | D2-5 | | | | | | | | |
| | | D2-6 | | | | | | | | |
| | Resin Modifier (D3) | D3-1 | 6.01 | 0.32 | | | | | | |
| | | D3-2 | | | 6.01 | 0.32 | | | | |
| | | D3-3 | | | | | 6.01 | | | |
| | | D3-4 | | | | | | 6.01 | | |
| (E) Component | | E-1 | | | | | | | | 62.8 |
| | | E-2 | | | | | | | | |
| | | E-3 | 58.7 | 62.2 | 58.7 | 62.2 | 58.7 | 58.7 | | |
| (F) Component | | F-1 | 3.8 | 4.0 | 3.8 | 4.0 | 3.8 | 3.8 | | |
| | | F-2 | 0.39 | 0.42 | 0.39 | 0.42 | 0.39 | 0.39 | 3.42 | 1.28 |
| Total | | | 100.0 | 100.0 | 100.0 | 100.0 | 100.0 | 100.0 | 100.0 | 100.0 |
| (A) Component Proportion (mass %) | | | 30% | 32% | 30% | 32% | 30% | 30% | 91% | 34% |
| (B) Component Ratio [phr] | | | 1.8 | 1.8 | 1.8 | 1.8 | 1.8 | 1.8 | 2.9 | 2.9 |
| (C) Component Ratio [phr] | | | 1.8 | 1.8 | 1.8 | 1.8 | 1.8 | 1.8 | 2.9 | 2.9 |
| (D) Part by Mass:100 Parts by Mass of (A) | | | 20 | 1.0 | 20 | 1.0 | 20 | 20 | 0 | 0 |
| (E) Component Proportion (mass %) | | | 65% | 63% | 59% | 62% | 59% | 59% | 0% | 63% |
| Evaluation | Thermosetting Property:Bond Strength [MPa] | | 8 | 12 | 7 | 10 | 7 | 7 | 12 | 11 |
| | UV Curability:Bond Strength [MPa] | | 11 | 12 | 10 | 10 | 7 | 7 | 12 | 11 |
| | Long Pot Life | Time (I) | >7 Days | 4 Days | >7 Days | 5 Days | 3 Days | 3 Days | 1 Day | 1 Day |
| | | Evaluation | S | A | S | A | B | B | C | C |
| | Curing Shrinkage (%) | | 2.0 | 2.0 | 2.0 | 2.0 | 2.0 | 2.0 | 6.0 | 2.0 |

TABLE 2-continued

| Amount of Incorporation (part by mass) | | | Comparative Example 3 | 4 | 5 | 6 | 7 | 8 |
|---|---|---|---|---|---|---|---|---|
| (A) Component | | A1-1 | 13.6 | 13.6 | | 13.1 | | |
| | | A1-2 | | | 4.52 | | 4.45 | 4.01 |
| | | A1-3 | | | | | | |
| | | A1-4 | 2.72 | 2.72 | 4.84 | 2.63 | 4.77 | 4.29 |
| | | A2-1 | 17.7 | 17.7 | 22.6 | 17.1 | 22.3 | 20.1 |
| (B) Component | | B-1 | 0.98 | 0.98 | 0.49 | 0.95 | 0.56 | 0.50 |
| (C) Component | | C-1 | 0.98 | 0.98 | | 0.95 | | |
| | | C-2 | | | 0.65 | | 0.56 | 0.50 |
| (D) Component | Surfactant (D1) | D1-1 | | | | 3.29 | | |
| | | D1-2 | | | | | | |
| | | D1-3 | | | | | | |
| | | D1-4 | | | | | | |
| | | D1-5 | | | | | | |
| | | D1-6 | | | | | | |
| | | D1-7 | | | | | | |
| | | D1-8 | | | | | | |
| | | D1-9 | | | | | | |
| | | D1-10 | | | | | | |
| | Antioxidant (D2) | D2-1 | | | | | 1.57 | |
| | | D2-2 | | | | | | |
| | | D2-3 | | | | | | |
| | | D2-4 | | | | | | |
| | | D2-5 | | | | | | |
| | | D2-6 | | | | | | |
| | Resin Modifier (D3) | D3-1 | | | | | | 11.3 |
| | | D3-2 | | | | | | |
| | | D3-3 | | | | | | |
| | | D3-4 | | | | | | |
| (E) Component | | E-1 | | | | 60.7 | | |
| | | E-2 | 62.8 | | | | | |
| | | E-3 | | 62.8 | 62.4 | | 61.4 | 55.3 |
| (F) Component | | F-1 | | | 4.0 | | 4.0 | 3.6 |
| | | F-2 | 1.28 | 1.28 | 0.42 | 1.23 | 0.41 | 0.37 |
| Total | | | 100.0 | 100.0 | 100.0 | 100.0 | 100.0 | 100.0 |
| (A) Component Proportion (mass %) | | | 34% | 34% | 32% | 33% | 31% | 28% |
| (B) Component Ratio [phr] | | | 2.9 | 2.9 | 1.5 | 2.9 | 1.8 | 1.8 |
| (C) Component Ratio [phr] | | | 2.9 | 2.9 | 2.0 | 2.9 | 1.8 | 1.8 |
| (D) Part by Mass:100 Parts by Mass of (A) | | | 0 | 0 | 0 | 10 | 5.0 | 40 |
| (E) Component Proportion (mass %) | | | 63% | 63% | 62% | 61% | 61% | 67% |
| Evaluation | Thermosetting Property:Bond Strength [MPa] | | 11 | 11 | 11 | 0 | 0 | 0 |
| | UV Curability:Bond Strength [MPa] | | 11 | 11 | 11 | 0 | 0 | 0 |
| | Long Pot Life | Time (I) | 1 Day | 1 Day | 1 Day | >7 Days | >7 Days | >7 Days |
| | | Evaluation | C | C | C | S | S | S |
| | Curing Shrinkage (%) | | 2.0 | 2.0 | 2.0 | — | — | — |

In Table 1 and Table 2, (A) Component Proportion means a percentage by mass of the (A) component with respect to the total mass of the thermosetting composition, and (E) Component Proportion means a percentage by mass of the (E) component with respect to the total mass of the thermosetting composition. (B) Component Ratio means a part by mass (phr) of the (B) component with respect to 100 parts by mass of the resin (A), and (C) Component Ratio means a part by mass of the (C) component with respect to 100 parts by mass of the resin (A). In Comparative Examples 6 to 8, "-" in Curing shrinkage shows that the thermosetting compositions were neither thermally cured nor UV cured, and the curing shrinkages were thus not measured.

From results shown in Table 1 and Table 2, the thermosetting compositions in Examples 1 to 37, in each of which the content of the stabilizer (D) in the resin (A) is less than or equal to a prescribed proportion, have the excellent thermosetting property and UV curability allowing for temporary bonding, have a low curing shrinkage, and have a long pot life. In contrast, the thermosetting compositions in Comparative Examples 1 to 8, in each of which no stabilizer (D) is contained or the content of the stabilizer (D) in the resin (A) is greater than the prescribed proportion, cannot achieve the excellent thermosetting property and UV curability allowing for temporary bonding and a low curing shrinkage.

The invention claimed is:

1. A thermosetting composition comprising:

a resin (A) including at least one type of group selected from the group consisting of epoxy group, oxetane group, and vinyl ether group;

a cationic thermal polymerization initiator (B);

a cationic photopolymerization initiator (C); and a stabilizer (D), wherein:

the stabilizer (D) includes at least one selected from the group consisting of a surfactant (D1), an antioxidant (D2), and a resin modifier (D3), the resin modifier (D3) includes at least one selected from the group consisting of a carbodiimide compound, a polyester polyol, an episulfide compound, a sucrose derivative, an olefin compound, an organic acid and an anhydride thereof, and when the stabilizer (D) includes the surfactant (D1) in a proportion of X % by mass, the antioxidant (D2) in a proportion of Y % by mass, and the resin modifier (D3) in a proportion of Z % by mass, with respect to a total mass of the stabilizer (D), a proportion of the stabilizer (D) with respect to 100 parts by mass of the resin (A) being less than or equal to (5.0×X+1.5×Y+20.0×Z)/100 parts by mass.

2. The thermosetting composition of claim 1, wherein the stabilizer (D) includes only one of the surfactant (D1), the antioxidant (D2), and the resin modifier (D3), and a proportion of the surfactant (D1) with respect to 100 parts by mass of the resin (A) is less than or equal to 5.0 parts by mass, a proportion of the antioxidant (D2) with respect to 100 parts by mass of the resin (A) is less than or equal to 1.5 parts by mass, and a proportion of the resin modifier (D3) with respect to 100 parts by mass of the resin (A) is less than or equal to 20.0 parts by mass.

3. The thermosetting composition of claim 1, wherein the surfactant (D1) is a non-ionic surfactant, and the non-ionic surfactant includes at least one type of component selected from sorbitan ester and sorbitol ester.

4. The thermosetting composition of claim 1, wherein the antioxidant (D2) contains at least one type of element selected from sulfur and phosphorus.

5. The thermosetting composition of claim 1, wherein the resin modifier (D3) includes the carbodiimide compound.

6. The thermosetting composition of claim 1, further comprising an inorganic filler (E).

7. The thermosetting composition of claim 1, wherein the thermosetting composition is an adhesive.

8. An electronic device comprising:

a first component;

a second component; and a hardened material layer lying between the first component and the second component to bond the first component and the second component to each other, the hardened material layer including a hardened material of the thermosetting composition of claim 1.

9. A method for producing an electronic device including a first component, a second component, and a hardened material layer lying between the first component and the second component to bond the first component and the second component to each other, the method comprising:

laying the thermosetting composition of claim 1 between the first component and the second component, irradiating the thermosetting composition with light to temporarily bond the first component and the second component to each other, and then heating the thermosetting composition to produce the hardened material layer.

10. The thermosetting composition of claim 1, wherein the stabilizer (D) includes at least two selected from the group consisting of the surfactant (D1), the antioxidant (D2), and the resin modifier (D3).

11. The thermosetting composition of claim 1, wherein the stabilizer (D) includes the surfactant (D1), the antioxidant (D2), and the resin modifier (D3).

12. The thermosetting composition of claim 1, the stabilizer (D) includes two selected from the group consisting of the surfactant (D1), the antioxidant (D2), and the resin modifier (D3), and the proportion of the stabilizer (D) with respect to 100 parts by mass of the resin (A) is greater than or equal to (0.1×X+0.01×Y+0.2×Z)/100 parts by mass.

13. The thermosetting composition of claim 1, wherein the stabilizer (D) includes the antioxidant (D2) and at least one selected from the group consisting of the surfactant (D1) and the resin modifier (D3).

14. The thermosetting composition of claim 1, wherein the antioxidant (D2) includes at least one selected from the group consisting of an amine-based antioxidant, a sulfur-based antioxidant, and a metal compound-based antioxidant.

* * * * *